United States Patent
Khalife et al.

(10) Patent No.: US 10,341,935 B2
(45) Date of Patent: Jul. 2, 2019

(54) METHOD FOR CORRECTING LOCALLY THE ROUTING PATH IN AN AD HOC NETWORK AND CORRESPONDING AD HOC NETWORK

(71) Applicant: THALES, Courbevoie (FR)

(72) Inventors: Hicham Khalife, Gennevilliers (FR); Hicham Anouar, Gennevilliers (FR); Didier Pirez, Gennevilliers (FR); Vania Conan, Gennevilliers (FR); Jawad Seddar, Gennevilliers (FR)

(73) Assignee: THALES, Courbevoie (FR)

( * ) Notice: Subject to any disclaimer, the term of this patent is extended or adjusted under 35 U.S.C. 154(b) by 297 days.

(21) Appl. No.: 15/179,471

(22) Filed: Jun. 10, 2016

(65) Prior Publication Data
US 2016/0366634 A1     Dec. 15, 2016

(30) Foreign Application Priority Data
Jun. 12, 2015  (FR) .................... 15 01223

(51) Int. Cl.
*H04W 40/34*     (2009.01)
*H04B 7/155*     (2006.01)
(Continued)

(52) U.S. Cl.
CPC .............. *H04W 40/34* (2013.01); *H04B 7/01* (2013.01); *H04B 7/155* (2013.01);
(Continued)

(58) Field of Classification Search
CPC ..... H04W 84/18; H04W 88/04; H04W 88/06; H04W 40/30; H04W 40/12; H04W 40/22;
(Continued)

(56) References Cited

U.S. PATENT DOCUMENTS

| 8,392,607 B2 | 3/2013 | Ishii et al. |
| 2008/0095058 A1 | 4/2008 | Dalmases et al. |

(Continued)

FOREIGN PATENT DOCUMENTS

JP     2009225125 A    10/2009

OTHER PUBLICATIONS

Preliminary Search Report for FR 1501223 completed Nov. 30, 2015.
(Continued)

*Primary Examiner* — Will W Lin
(74) *Attorney, Agent, or Firm* — B. Aaron Schulman, Esq.; Stites & Harbison, PLLC

(57) ABSTRACT

This method, executed in a group of nodes of the ad hoc network (1) including a source (10), first and second relays (11, 12) and an addressee (13), the relays being neighbors of the source, the addressee being a neighbor of the relays, the source having useful data to be retransmitted towards a final addressee (15) through a routing path passing through the first relay (11), and then the addressee (13), consist of: computing a first characteristic quantity of an elementary path between the source (10) and the addressee (13), via the first relay (11) and a second characteristic quantity of an elementary path between the source (10) and the addressee (13), via the second relay (11); verifying the observance of a criterion for the first characteristic quantity; and, in case of negative verification, using the second relay (12) for relaying the useful data from the source (10), towards the addressee (13).

11 Claims, 2 Drawing Sheets

(51) Int. Cl.
*H04W 84/18* (2009.01)
*H04B 7/01* (2006.01)
*H04L 12/26* (2006.01)
*H04W 8/00* (2009.01)
*H04W 40/12* (2009.01)
*H04L 12/721* (2013.01)
*H04L 12/741* (2013.01)
*H04W 88/04* (2009.01)

(52) U.S. Cl.
CPC ......... *H04L 43/0882* (2013.01); *H04W 8/005* (2013.01); *H04W 84/18* (2013.01); *H04L 45/70* (2013.01); *H04L 45/745* (2013.01); *H04W 40/12* (2013.01); *H04W 88/04* (2013.01)

(58) Field of Classification Search
CPC ...... H04W 40/34; H04W 8/005; H04L 45/00; H04L 45/02; H04L 45/16; H04L 45/22; H04L 41/12; H04L 43/0882; H04L 45/70; H04L 45/745; H04B 7/01; H04B 7/155
See application file for complete search history.

(56) References Cited

U.S. PATENT DOCUMENTS

| | | | |
|---|---|---|---|
| 2010/0020740 A1* | 1/2010 | Watanabe | H04B 7/2606 370/315 |
| 2010/0167743 A1* | 7/2010 | Palanki | H04B 7/155 455/436 |
| 2011/0047291 A1 | 2/2011 | Ishii et al. | |
| 2014/0056210 A1* | 2/2014 | Jafarian | H04W 88/04 370/315 |

OTHER PUBLICATIONS

Yin Wang et al: "Exploiting constructive, interference for scalable flooding in wireless networks", IEEE / ACM Transactions on Networking, IEEE / ACM, New York, NY, US, vol. 21, No. 6, Dec. 1, 2013 (Dec. 1, 2013), pp. 1880-1889, XP058045594, ISSN: 1063-6692, DOI: 10.1109/TNET.2013.2238951 *le document en entier*.

* cited by examiner

METHOD FOR CORRECTING LOCALLY THE ROUTING PATH IN AN AD HOC NETWORK AND CORRESPONDING AD HOC NETWORK

The present invention relates to a method for locally correcting the routing path in an ad hoc network.

A node of such a network is both a terminal node, i.e. an initial source or a final addressee of a data message or an intermediate node for receiving and retransmitting a data message along a routing path between an initial source and a final addressee of the data message.

In such a network, a node is considered as being a neighbor of another node when they are sufficiently close so that a communication link may be established. In the following, the neighboring nodes of a node are so called nodes of rank one of this node, and the neighboring nodes of the nodes of rank one of this node are so called nodes of rank two of this node. Thus, from the relevant node, a node of rank one is accessible by at least one jump, or hop, while a node of rank two is accessible with at least two hops.

An ad hoc network is a network for which the topology may change overtime, with the displacement of the nodes relatively to each other and the modification of the links between nodes.

A routing table, allowing the nodes to share a same vision of the network and each node of knowing to which neighboring node a data message is to be retransmitted so that the latter is forwarded from node to node towards a final addressee, should be updated regularly in order to take into account the time-dependent change in the topology.

To do this, the nodes regularly emit signaling signals. Such a signal notably includes a unique identifier of the transmitting node on the network. The signaling signals received by a node allow the latter to be aware of the nodes which, at the current instant, are located in its neighborhood.

This neighbor information at one hop from the node is, in a particular routing type, transmitted to the central node of the network which is connected to a device capable of determining the topology of the network and, from the latter, of building a general routing table. The latter defines, for each pair of nodes formed with an initial source node and a final addressee node, the single routing path which a data message has to follow through the network, i.e. the ordered list of the intermediate nodes giving the possibility of forwarding a data message between the initial source node and the final addressee node. The device then generates a local routing table, specific to a particular node, and which indicates the identifier of the neighboring node to which the relevant node should retransmit a data message addressed to a final addressee node. The local routing table of one node therefore associates the identifier of a final addressee with the identifier of a node of rank one. The local routing tables are then transmitted to each of the nodes of the network.

Other types of routing are known to one skilled in the art. However, generally for all the routing types, the updating of the local routing table of one node requires significant time between the determination of the neighborhood of this node, the sharing of a change of neighborhood with the other nodes of the network so that the nodes have the same vision of the network, and the definition of a local routing table for the relevant node, allowing it to suitably retransmit the messages. This time notably increases depending on the number of nodes making up the network. Thus, it is possible that the local routing table once available to a node, no longer corresponds exactly to the topology of the network around this node at the current instant.

For example a node may be extracted from the neighborhood of the relevant node. This leads to a breaking of the communication between the final addressee nodes associated with this node of rank one, in the local routing table. For example further, the quality of the communication with a node of rank one may be degraded, this neighboring node being momentarily masked. This leads to a lowering of the quality of the communication to the final addressee nodes associated with this node of rank one, in the local routing table. It is then necessary to repeat the transmission of the data message and therefore loose band width.

But, the routing table cannot be updated with a too low frequency. Indeed, the amount of signaling messages circulating on the network so that the nodes may share a common vision of the topology of the network reduces by as much the band width for the data messages.

The object of the invention is therefore to overcome this latency problem in the updating of the routing information used by a node.

The object of the invention is therefore a method for locally correcting the routing path in an ad hoc network including a plurality of nodes, each node including transceiver means able to receive and transmit data messages, the nodes communicating with each other by sending signals corresponding to said data messages in time slots organized in frames, the frames being synchronized through the ad hoc network, a routing of the data messages being carried out through the ad hoc network on the basis of a routing table defining a routing path for the communication between each pair of nodes of the network, characterizing that said method is applied in a group of nodes of the ad hoc network including a source node, at least first and second relay nodes, and an addressee node, the first and second relay nodes being neighbors of the source node, the addressee node being a neighbor of the first and second relay nodes but not being a neighbor of the source node, the source node having useful data to be re-transmitted to a final addressee and the routing table indicating that the corresponding routing path passes through the first relay node, and then through the addressee node, and in that said method includes steps:

for calculating, with the source node, a characteristic quantity of an elementary path between the source node and the addressee node, via the first relay node and of a characteristic quantity of an elementary path between the source node and the addressee node via the second relay node;

verifying, with the source node, observance of a predetermined criterion for said characteristic quantity of the elementary path between the source node and the addressee node, via the first relay node; and, in the case of negative verification, using the second relay node for relaying the data message from the source node to the addressee node.

The invention solves the problem of latency as mentioned above, by proposing a mechanism for locally correcting the routing path giving the possibility of having a node take into account any modification of its neighborhood at one hop.

According to particular embodiments, the method includes one or several of the following features, taken individually or according to all the technically possible combinations:

during a signaling slot of each frame, each node has the possibility of transmitting a signaling message including signaling information, the signaling information giving the possibility to each node of determining its neighboring nodes of rank one, a connection quality with each of its neighboring nodes of rank one, its neighboring nodes of rank two, and a connection quality between a neighboring node of rank one and a neighboring node of rank two, the connection qualities allowing, in the computing step, a source node of determining a communication quality.

the step for using the second relay node consist of relaying the useful data towards the addressee node both through the elementary path between the source node and the addressee node, via the first relay node, and via the elementary path between the source node and the addressee node, via the second relay node.

the step for using the second relay node applies an operating mode for forming a bundle, in which first and second relay communication messages, transmitted by the first and second relay nodes respectively, interfere constructively at the addressee node, at least in their respective portions of pay load including useful data to be retransmitted, the first and second relay communication messages being transmitted during a dedicated relay communication slot of the frame.

the addressee node measures a phase of a signal transmitted by a relay node from a pattern, characteristic of the transmitting relay node, provided in a header portion of the relay communication message; selects one of the relay nodes as master relay nodes; computes for each of the other relay nodes, so called slave nodes, a phase shift resulting from the difference between the measured phase for the relevant slave relay node and the phase measured for the master relay node; and transmits the computed phase shift to the corresponding slave relay node in an adjustment message transmitted in a dedicated adjustment slot of the frame, and a relay node having received an adjustment message adjusts a phase of its transceiver means so as to cancel out the phase shift indicated in said adjustment message.

each relay node is able to compute a frequency drift of its transceiver means from the phase shift contained in a succession of adjustment messages transmitted by a same addressee node and of adjusting the frequency of its transceiver means so as to correct said frequency drift, at least during the relay communication slot for transmitting a relay communication message to said addressee node.

the characteristic quantity being a communication quality along an elementary path, the predetermined criterion consist of verifying that the characteristic quantity of the elementary path between the source node and the addressee node, via the first relay node, which is the relay node indicated by the routing table, is greater than the characteristic quantity of the elementary path between the source node and the addressee node, via the second relay node the step for using the second relay node consist of relaying the useful data towards the addressee node only through the second relay node, as a substitution for the first relay node.

The object of the invention is also an ad hoc network including a plurality of nodes capable of receiving and transmitting data messages and communicating with each other by sending signals in time slots organized as frames, characterizing that each node includes means for applying the previous method.

According to particular embodiments, the network includes one or several of the following features, taken individually or according to all the technically possible combinations:

the frames include: A signaling slot, allowing each node to transmit a signaling signal including signaling information, the pieces of signaling information allowing each node to determine its neighboring nodes of rank one, a connection quality with each of its neighboring nodes of rank one, its neighboring nodes of rank two, and a connection quality between each node of rank one and each node of rank two; A source communication slot, allowing a node operating as a source node to transmit a source communication message to a node of rank one operating as a relay node, the source communication message including useful data to be transmitted to a final addressee; A relay communication slot, allowing a node operating as a relay node to transmit a relay communication message to an addressee node, the relay communication message including a header portion integrating a pattern, characteristic of the transmitting relay node, allowing the addressee node to compute a phase of the signal corresponding to the relay communication message, and a portion of a useful pay load including useful data to be relayed to the addressee node; And an adjustment slot, allowing the node operating as an addressee node to transmit an adjustment message to a relay node from a set of relay nodes used in a mode for forming a bundle, the adjustment message including a phase shift, each addressee node of a plurality of relay communication messages transmitted by relay nodes from a set of relay nodes used in a mode for forming a bundle, is able to compute a phase for which said relay nodes from the corresponding signal to the incident relay communication message, to determine a phase shift between at least two of said relay nodes and to transmit the computed phase shift to one of said at least two relay nodes, in an adjustment message transmitted in a dedicated adjustment slot of the frame, each node operating as a relay node is able to estimate a frequency drift of its transceiver means from the phase shift contained in a succession of adjustment messages transmitted by a same addressee node and of adjusting its transceiver means for correcting said drift.

the routing table of a node includes, for each addressee for useful data, the neighboring node of rank one of the relevant node and the neighboring node of rank two of the relevant node along the routing path.

The features and advantages of the invention will become apparent upon reading the description which follows, only given as an example, and made with reference to the appended drawings, wherein.

Figure 1:
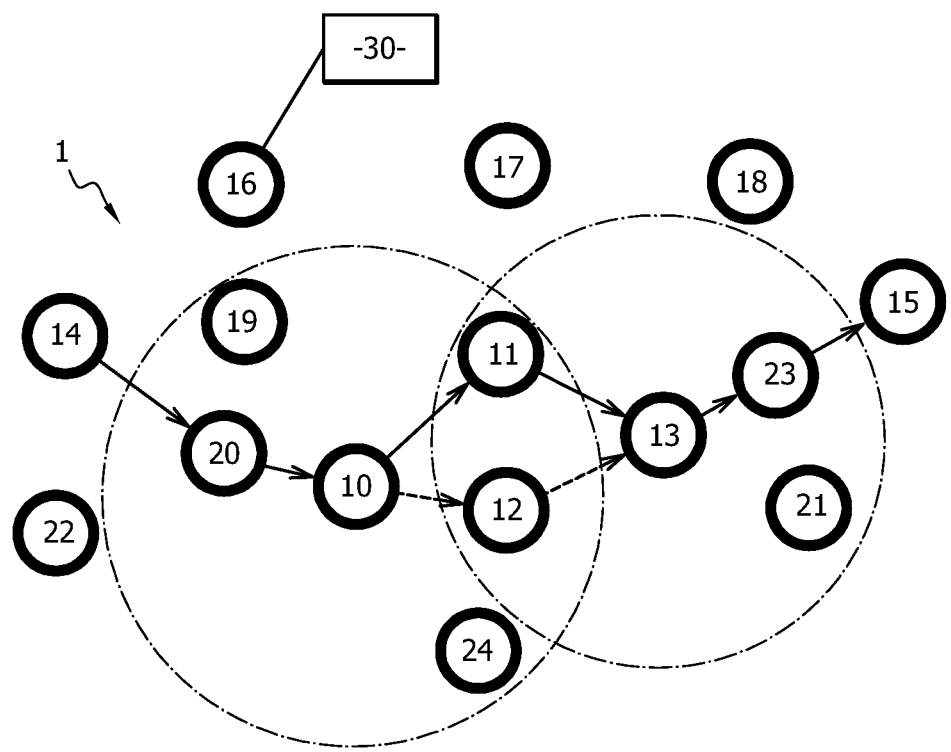
FIG. 1 is a schematic view of an ad hoc network at a given time instant.

The network 1 illustrated in FIG. 1 is for example an ad hoc network for communication between individuals on a field of operations.

Each individual is equipped with a transceiver forming a node of the network.

The network 1 illustrated in FIG. 1 consists of fifteen nodes referenced from 10 to 24. The nodes are identical with each other.

In a way known per se, according to the ISO model, a node notably includes a data connection layer, designated in the following as a MAC (Media Access Control) between a physical layer and a routing layer. By layer is meant the whole of the hardware or software means for applying the corresponding function.

The MAC layer of each node includes communication means for receiving and transmitting data messages. The data messages are transmitted as signals, for example radio signals, in a given channel. The communication means are able to adjust the phase and the frequency of these signals.

The network 1 is a time division multiple access network or TDMA network. Time is thus subdivided into frames ("Frame_1" in FIG. 2) with constant duration, and each frame is itself subdivided in a predetermined way into time slots.

The various nodes of the network are synchronized with each other, for example by a synchronization signal delivered by a satellite positioning system. In this way, each node knows to which slot of the frame corresponds the current instant.

The node 16 is for example connected to a device 30 able to determine the topology of the network, to periodically generate a general routing table from the determined topology, and to pass it on to each of the nodes of the network as a local routing table. The routing and how to obtain a local routing table are not part of the invention and other routing types may be applied.

The routing layer of each node thus stores in memory a current local routing table.

The general routing table gives the possibility of defining, between each pair of nodes consisting of an initial source node and a final addressee node, a single routing path. Thus, between the node 14, as an initial source node, and node 15, as a final addressee node, the general routing table defines the routing path indicated by the continuous arrows in FIG. 1. In particular, between the nodes 10 and 13, the provided routing path passes through the intermediate node 11.

In the present invention, the local routing table of a node is such that it associates an identifier of a final addressee node, with an identifier of a node of rank one and with an identifier of a node of rank two. For example, the local routing table of the node 10, associates with the node 15, the node 11 of rank one and the node 12 of rank two.

However, the local routing table is only updated at a reduced frequency relatively to the displacements of the nodes in the network 1 and to the modification of the neighborhood of the relevant node.

For example, the intermediate node 12, which, at the relevant instant, is found in the neighborhood of a hop of the node 10 may be used as a relay between the nodes 10 and 13, either in the place of the intermediate node 11 provided by the routing, or in addition to the intermediate node 11 provided by the routing.

The method for correcting the routing path will allow, at the MAC layer of the network, the use of intermediate nodes, other than the one indicated by the routing, for relaying the information between a source node and an addressee node, located at two hops from the source node along the routing path.

The method for correcting the routing is thus locally applied in a group of nodes consisting of:
- a source node, as node 10, as a source node of the data message to be re-transmitted towards a final addressee node, such as node 15;
- an addressee node, such that the node 13, as a node towards which the data message propagates, located at two hops from the source node along the routing path towards the final addressee node;
- at least two relay nodes, such that the first relay node 11 and the second relay node 12 as intermediate nodes giving the possibility of relaying the data message between the source node 10 and the addressee node 13.

The first relay node 11 is located on the routing path while the second relay node 12 is located outside the routing path.

The relay nodes 11 and 12 are located in the vicinity of the source node, 11, and in that of the addressee node 13, neighborhoods materialized by a circle in FIG. 1.

On the other hand, the addressee node 13 is not found in the neighborhood at one hop from the source node 10, but in the neighborhood at two hops from the source node 10.

Alternatively, more than two relay nodes are located at the relevant instant, in the neighborhood of the source node 10 and in that of the addressee node 13, and are used for correcting the routing path.

Figure 2:
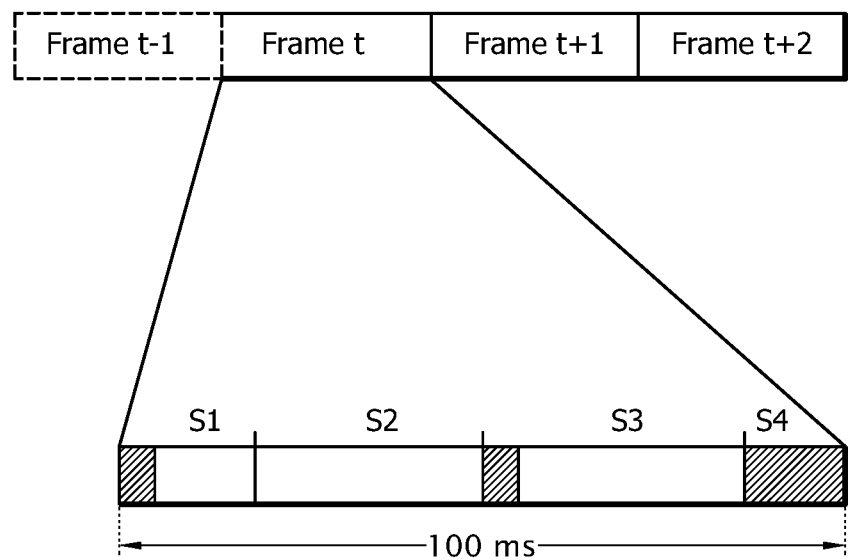
FIG. 2 is an illustration of the format of the communication frames used by the network of FIG. 1; and, FIG. 3 is a flow chart of the method for correcting the routing according to the invention.

With reference to FIG. 2, the network 1 uses time slots for transmitting data messages, these slots being distributed in the frames.

The subdivision of the frames into slots is constant from one frame to the other. The duration of each slot is constant from one frame to the other. The duration of the frames is therefore constant.

Each frame is broken down into slots according to the following format: a signaling slot S1; a source communication slot S2; a relay communication slot S3; and an adjustment slot S4.

During the signaling slot S1, with a duration of 15 ms for example, a node may transmit a signaling message including signaling information.

The pieces of signaling information include an identifier of the transmitting node. A node receiving the signaling message is thus able to determine the whole of the nodes found in its neighborhood.

The pieces of signaling information for example include a Walsh sequence or the equivalent, so as to allow a node receiving the signaling message to determine a quality of the connection with the transmitting node. The quality of the connection is for example a signal to noise ratio (SNR) or a received signal power indicator (RSSI for <<Received Signal Strength Indication >>) or any quantity which may be measured by the MAC layer of the receiving node.

The pieces of signaling information for example include the quality of the connection between the transmitting node and each of its neighboring nodes. Thus, the node receiving the signaling message is aware, for each of its neighboring nodes, of the quality of the connection between this neighboring node, and each of the neighboring nodes of this neighboring node. That is to say that the receiving node is aware of the quality of the connection between a node of rank one and a node of rank two.

The MAC layer of each node thus keeps an updated list associating with the identifier of each node of rank one, the quality of the connection with this node of rank one, as well as the identifiers of each node of rank two, and the quality of the connection between this node of rank two and the corresponding rank node.

For each node of rank two from the list, the MAC layer of a node is able to compute a quality of the communication along the elementary path between the relevant node and this node of rank two via the corresponding node of rank one. For example, a max-min algorithm is used taking into account the connection quality over the connection between the relevant node and the node of rank one, and the connection quality over the connection between the node of rank one and the node of rank two.

During the source communication slot S2, with a duration of 34 ms for example, a node operating as a source node may transmit a source communication message towards a relay node.

The source communication message includes useful data to be transmitted to the final addressee node, as well as an identifier of the addressee node at two hops 13 and an identifier of said or each relay node at one hope, 11 or 12, which have to relay the useful data towards this addressee node. It should be noted that the addressing may be ensured by addressing explicitly each of the addresses of the data message, or one of them by addressing the message to a group of nodes, which identifies several addresses which will recognize each other.

During the relay communication slot S3, with a duration of 35 ms for example, a node operating as a relay, such as nodes 11 and 12, may transmit a relay communication message.

Each communication message relays, during a first subslot of 1 ms for example, a header portion integrating a pattern characteristic of the transmitting relay node, allowing the addressee node to compute a phase for this transmitting relay node. Each relay communication message includes, during a second sub-slot of 34 ms for example, a useful pay load portion including useful data to be relayed towards the addressee node 13.

During the adjustment slot S4, with a duration of 15 ms for example, an addressee node, such as node 13, may send an adjustment message towards a relay node from which it has received a relay communication message. The adjustment message includes an identifier of this relay node and a phase shift $\Delta\varphi$.

It will be noted that the slot S4 as well as the 1 ms sub-slot of S3 are only useful for the operating mode for forming a bundle 300 which will be described below.

Figure 3:
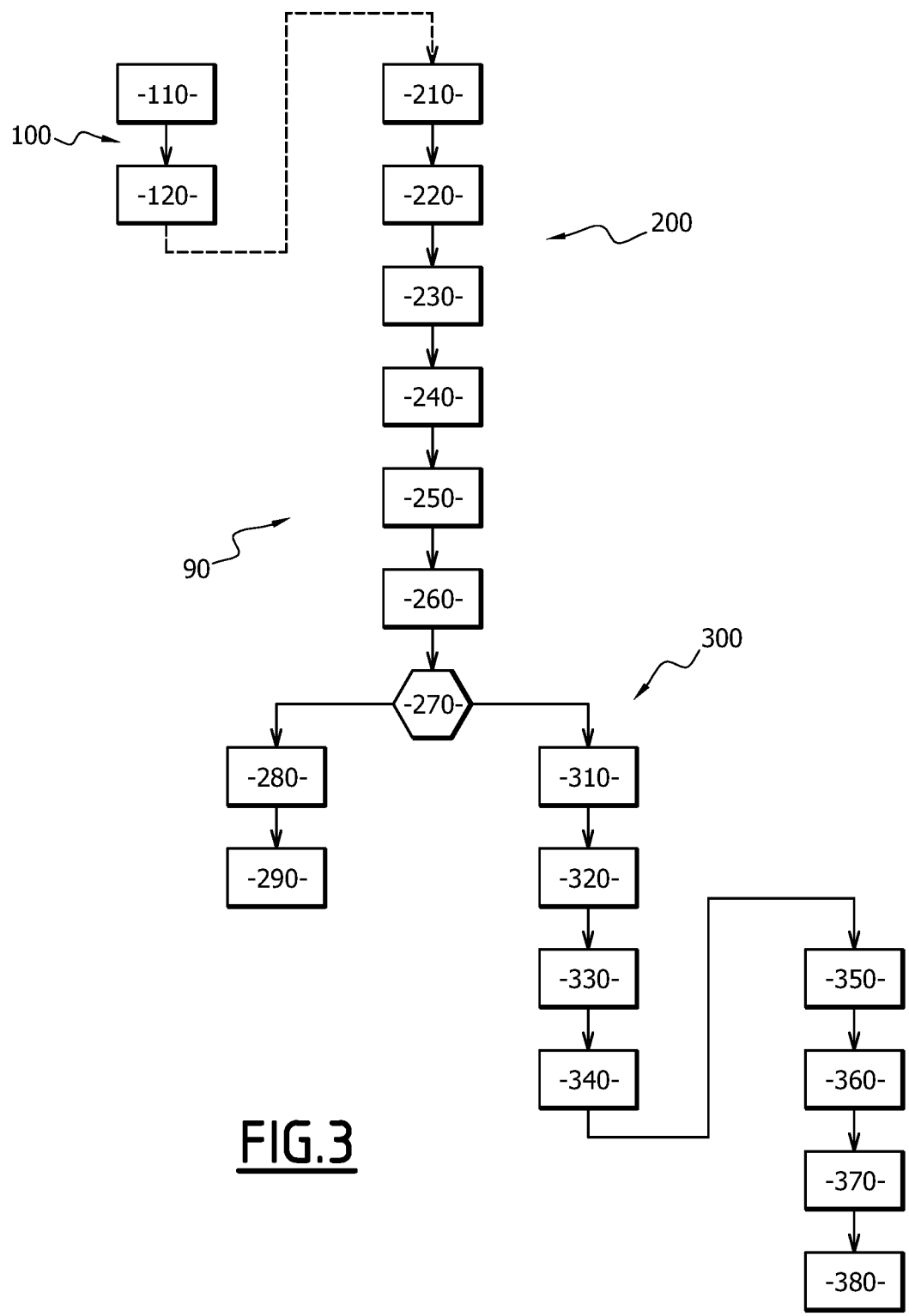

Each node is able to apply the method 90 of FIG. 3.

The method 90 includes an algorithm for discovering the neighborhood 100 allowing the MAC layer of one node to discover its environment.

More specifically, in step 110, each node transmits, in the signaling slot S1, a signaling message including signaling information as indicated earlier.

In step 120, the MAC layer of a node receiving a signaling message updates its list with the information contained in this signaling message. In particular, on the basis of the Walsh sequence, at the beginning of the signaling message, the receiving node determines the quality of the connection with the node transmitting the signaling message. By means of the list, each node is not only aware of its neighborhood at one hop, but also of its neighborhood with two hops.

Some of the pieces of information contained in the list are optionally transmitted over the network 1 to the node 16 connected to the updating device for the routing table. However, they are transmitted with a longer timescale (lower frequency), for example every 100 ms, (in order to minimize the burden related to the updating of the routing table over the network.

However, the discovering mechanisms of the routing type applied are generally independent and carry out separately at a longer timescale.

The local routing table stored by the routing layer of a node is thus periodically refreshed. The local routing table of a node is built so as to indicate to the relevant node the two next nodes on the routing path towards a final addressee.

Between two updating instants of the routing, a group of nodes applies the retransmission steps 200 of the method 90. In the following, these steps are illustrated by the group consisting of the nodes 10, 11, 12 and 13.

The retransmission of a message by the source node 10, towards a relay node of rank one takes into account the routing path indicated by the local routing table and possibly correction of the routing path as indicated by the local routing table.

Thus, in step 210, the MAC layer of the source node 10 receives a data message. The source node MAC layer 10 extracts the identifier of the final addressee node from the received data message.

In step 220, if the identifier of the final addressee node is not the identifier of the source node 10, the MAC layer of the source node 10 queries the routing layer, in order to determine the identifier of the node at one hop and the identifier of the node at two hops of the routing path.

In step 230, by consulting the local routing table, the routing layer identifies the routing path leading from the source node to the final addressee and extracts the identifier of the node at one hop and the identifier of the node at two hops, when the latter exists (an assumption implicitly made for applying the present method). Thus, for forwarding a data message to the final addressee node 15, the routing layer of the source node 10 identifies, on the routing path defined by the local routing table, the node of rank one 11 and the node of rank two 13. Both of these identifiers have passed by the routing layer to the MAC layer.

In step 240, on the basis of the identifier of the node at two hops taken as the addressee node, the MAC layer consults the list and identifies the nodes of rank one which may allow relaying of a data message towards the addressee node. Thus, the source node 10 identifies the first relay node 11 and the second relay node 12 as giving the possibility of attaining the addressee node 13.

In step 250, for each of these relay nodes of rank one, the MAC layer of the source node computes the quality of the connection of the elementary path giving the possibility of passing from the source node to the addressee node, via the relevant node of rank one.

The quality of the communication along an elementary path is evaluated by taking into account the quality of the connection between the source node and the relevant node of rank one, as well as the quality of the connection between the relevant node of rank one and the addressee node of rank two. The qualities of connection are indicated in the list of the MAC layer of the source node.

In step 260, the MAC layer of the source node applies a first criterion for selecting an elementary path. For example, this first criteria consists of selecting the elementary path having the best communication quality from among the different elementary paths giving the possibility of attaining the addressee node. The MAC layer retains the identifier of the relay node of rank one associated with the elementary path selected as identifying the intermediate node towards which the data massage will be retransmitted. For example, if the quality of the communication along the second elementary path passing through the second relay node 12 is better than the quality of the communication along the first elementary path passing through the first relay node 11, the source node 10 retains the identifier of the second relay node 12 as an intermediate relay node to which the data message will be retransmitted towards the addressee node 13.

In step 270, a second criteria is verified on the communication quality along the selected elementary path.

For example and preferably, the second criterion consists of verifying whether the connection quality between the retained relay node and the addressee node is greater than a predetermined high threshold (depending on the radio operating parameters of the antenna with which are equipped the nodes). Alternatively, other first and second criteria may be applied. The first criterion may also be identical with the second criterion.

If this second criterion is verified, in step 280, the source node 10 transmits a source communication message to the retained intermediate relay node, in this case the second relay node 12. This source communication message is transmitted in the slot S2. The source communication message includes, in addition to the useful datum, the identifier of the relay node 12 and the identifier of the addressee node 13, so that the relay node 12 knows to which node the useful data should be retransmitted.

In step 290, the relay communication message is transmitted, by the relay node 12 to the addressee node 13. This relay communication message is transmitted in the slot S3. It includes, in its useful payload portion, the datum useful to be forwarded towards the final addressee. The relay node does not consult its routing table given that the source node imposes, in the source communication message, the addressee node.

On the other hand, if the second criterion is not met and the quality of the connection between the neighbor of rank one and the neighbor of rank two of the selected elementary path is less than or equal to the high threshold, the MAC layer of the source node 10 passes into an operating mode for the forming of a bundle, so that the steps referenced by the FIG. 300 in FIG. 3 are achieved.

The bundle formation consists of using a set of relay nodes of rank one for simultaneously retransmitting to a same addressee node relay communication messages, the useful payload portions of which are identical and include the useful datum. In order that the useful payload portions of the signals transmitted by the various relay nodes interfere constructively at the addressee node, it is necessary, in addition to the synchronization of the slot S3, to adjust the phase and optionally adjust the frequency of these signals.

More specifically, in step 310, the MAC layer of the source node 10 extracts a set of relay nodes of rank one from the list. For example, relay nodes of rank one corresponding to an elementary path for which the connection quality is less than a low predetermined threshold are not retained. The set of relay nodes groups the relay nodes of rank one used for forming the bundle towards the node of rank two, which is the addressee. Here, the set of relay nodes includes the first and second relay nodes 11 and 12.

In step 320, the source node 10 transmits, in the slot S2, a source communication message towards each of the relay nodes of the set of relay nodes. This message includes the identifiers of various relay nodes of rank one of the whole of the relay nodes as well as the identifier of the addressee node of rank two. The useful payload portion of this message includes useful data intended for the final addressee node 15.

In step 330, each of the relay nodes, 11 and 12, having received the source communication message from the source node 10, transmits, in the slot S3, a relay communication message to the addressee node 13. In particular, the relay communication message incorporates a header portion for example including a specific Walsh sequence of the transmitting relay node, 11 or 12, as well as a useful payload portion with the useful datum to be transmitted. There again, the relay node does not consult its routing table given that the source node imposes, in the source communication message, the addressee node. The relaying of the useful datum is therefore essentially carried out at the MAC level of the relay node.

In step 340, the addressee node 13 receives relay communication messages in the time slot S3. It normally retransmits the useful datum towards the relay node along the routing path towards the final addressee node 15.

In order to reduce the interferences between the signals of the relay nodes of the set of relay nodes used for forming the bundle, the addressee node 13 analyzes the Walsh sequences of the header portions of the received relay communication messages. The relay node is thus able to measure, for each relay node, a phase $\varphi$ of the signal transmitted by this relay node. How to calculate the phase from an information such as a Walsh sequence is known to one skilled in the art.

In step 350, the addressee node 13 selects a relay node from among the nodes of the set of relay nodes used for forming the bundle as a master relay node (for example relay node 11). The other nodes of the set of relay nodes used for forming the bundle are then so called slave nodes (for example node 12). For each of the slave nodes, the addressee node 13 computes a phase shift $\Delta\varphi$ by difference between the phase $\varphi$ measured for the relevant slave node and the phase $\varphi$ measured for the master node. The addressee node 13 thus computes a phase shift $\Delta\varphi$ for the relay node 12.

In step 360, the addressee node 13 transmits, in the time slot S4, an adjustment message to each of the slave nodes of the set of relay nodes used for forming the bundle, this adjustment message including the computed phase shift $\Delta\varphi$ for this slave node. Thus, the addressee node 13 transmits the phase shift $\Delta\varphi$ to the relay node 12.

In step 370, the relay node 12, having received an adjustment message in the adjustment slot S4, adjusts the phase of its transceiver module for canceling out the phase shift $\Delta\varphi$ indicated by the addressee node 13. This adjustment is carried out at the beginning of the slot S3 of the following frame.

Thus, during the transmission of a relay communication message in the slot S3 of the following frame, the various relay nodes of the set of the relay nodes used for forming the bundle will be in phase, (provided that the relative positions of the relay and addressee nodes have not changed too much in the meantime), so that the interferences between the signals which they transmit will be reduced. The transmission towards the addressee node will therefore be better than that along the elementary path provided by the routing.

Advantageously, in step 380, a slave node corrects the frequency drift of its transceiver module. For example, the second relay node 12 computes a time variation of the phase shift $\Delta\varphi$ computed by the addressee node 13. To do this, the relay node 12 stores in memory the phase shift $\Delta\varphi$ transmitted by the addressee node 13 at each frame. By dividing the difference between two successive phase shifts $\Delta\varphi$ by the duration $\Delta t$ of a frame, the relay node 12 determines a frequency drift $\Delta f$. In the relay communication slot S3, the relay node 12 then dynamically adjusts the operating frequency of its transceiver module in order to compensate for this frequency drift. Thus, if the adjustment of the phase allows reduction in the interferences at the beginning of each relay communication slot S3, the correction of the frequency gives the possibility of maintaining this reduction of the interferences all along the relay communication slot S3.

The various relay nodes of the set of relay nodes used for forming the bundle will then be in phase not only at the beginning but all along the relay communication slot S3. The transmission towards the addressee node will further be improved.

Alternatively, the method for correcting the routing only includes the step for selecting the relay node found on the elementary path having the best communication quality. If this relay node is different from the relay node indicated by the routing, it is substituted for the latter and the data message is only relayed by this node of rank one as a substitution. Thus, the use of a relay node other than the one indicated by the routing locally allows improvement of the communication.

In another alternative, the method for correcting the routing only includes the formation of a bundle as soon as the communication quality on the elementary path passing through the relay node indicated by the routing is insufficient. The use of the relay node different from the relay node indicated by the routing will then reinforce the relaying towards the addressee node, the various relay nodes operating simultaneously. Thus, the use of a relay node other than the one indicated by the routing locally gives the possibility of improving the communication.

It should be noted that in the formation of the bundle applied in the present method, it is the addressee node which controls the adjustment of the relay nodes used. There is no communication between the relay nodes between them.

It should also be noted that at the relevant instant, the relay node indicated by the routing may no longer be in the neighborhood of the relevant source node. Thus, the application of the method gives the possibility, when such a situation occurs, of not interrupting the current communication between the initial source node and the final addressee node.

Finally, the formation of a bundle has the advantage of increasing the range of the communication towards the addressee node. Therefore, the communication is less sensitive to the distance of the addressee node from the relay node indicated by the routing.

One skilled in the art will observe that in the present method, one node out of two along a given routing path may be considered as a source node and that the nodes of rank one of a source node as relay nodes. The possible correction of the routing path is carried out at the relay nodes of the relevant routing path.

However, every two hops, the method provides the possibility of returning on the predefined routing path. Therefore there cannot be any divergence which would lead to the data message from gradually moving away from the routing path.

The correction of the routing path is transparent for the routing layer of the nodes. In particular, the neighborhood information at one hop or at two hops from a source node are not retransmitted at each modification to the routing layer upon awaiting an update of the local routing table. The method according to the invention therefore alleviates the routing: the amount of signaling information for updating the routing to be propagated over the network is reduced; the duration of validity of a routing table is increased. The band width is therefore allocated to the transmission of useful data.

The invention claimed is:

1. A method for locally correcting the routing path in an ad hoc network including a plurality of nodes, each node including transceiver means able to receive and transmit data messages, the nodes communicating with each other by sending signals corresponding to said data messages in time slots organized in frames, the frames being synchronized through the ad hoc network, a routing of the data messages being achieved through the ad hoc network on the basis of a routing table defining a routing path for the communication between each pair of nodes of the network,
wherein said method is applied in a group of nodes of the ad hoc network including a source node, at least first and second relay nodes, and an addressee node, the first and second relay nodes being neighbors of the source node, the addressee node neighboring the first and second relay nodes but not neighboring the source node, the source node having useful data to be retransmitted towards a final addressee and the routing table indicating that the corresponding routing path passes through the first relay node, and then through the addressee node,
and in that said method includes the steps of:
computing, by the source node, of a characteristic quantity of an elementary path between the source node and the addressee node, via the first relay node and a characteristic quantity of an elementary path between the source node and the addressee node, via the second relay node;
verifying, by the source node, of the observance of a predetermined criterion for said characteristic quantity of the elementary path between the source node and the addressee node, via the first relay node; and in the case of negative verification,
using the second relay node for relaying the useful data from the source node, to the addressee node; and
wherein, during a signaling time slot of each frame, each node has the possibility of transmitting a signaling message including signaling information, the pieces of signaling information allowing each node to determine its neighboring nodes of rank one, a connection quality with each of its neighboring nodes of rank one, its neighboring nodes of rank two, and a connection quality between a neighboring node of rank one and a neighboring node of rank two, the connection qualities giving the possibility, in the computing step, to a source node of determining a communication quality.

2. The method according to claim 1, wherein the step for using the second relay node consists of relaying the useful data towards the addressee node both via the elementary path between the source node and the addressee node, via the first relay node, and via the elementary path between the source node and the addressee node, via the second relay node.

3. The method according to claim 2, wherein the step for using the second relay node applies an operating mode in the formation of a bundle, wherein first and second relay communication messages, transmitted by the first and second relay nodes respectively, interfere constructively at the addressee node, at least in their respective useful payload portions including the useful data to be retransmitted, the first and second relay communication messages being transmitted during a dedicated relay communication slot of the frame.

4. The method according to claim 3, wherein the addressee node:
measures a phase of a signal transmitted by a relay node from a pattern, characteristic of the transmitting relay node, provided in a header portion of the relay communication message;
selects one of the relay nodes as master relay nodes;
computes for each of the other relay nodes, so called slave nodes, a phase shift resulting from the difference between the phase measured for the relevant slave relay node and the phase measured for the master relay node; and,
transmits the computed phase shift to the corresponding slave relay node in an adjustment message transmitted in a dedicated adjustment slot of the frame, and wherein a relay node having received an adjustment message adjusts a phase of its transceiver means so as to cancel out the phase shift indicated in said adjustment message.

5. The method according to claim 4, wherein each relay node is able to compute a frequency drift of its transceiver means from the phase shift contained in a succession of adjustment messages transmitted by a same addressee node and of adjusting the frequency of its transceiver means so as to correct said frequency drift, at least during the relay communication slot for transmitting a relay communication message to said addressee node.

6. The method according to claim 1, wherein, the characteristic quantity being a communication quantity along an elementary path, the predetermined criterion consist of verifying that the characteristic quantity of the elementary path between the source node and the addressee node, via the first relay node, which is the relay node indicated by the routing table, is greater than the characteristic quantity of the elementary path between the source node and the addressee node, via the second relay node, the step for using the second relay node consisting of relaying the useful data towards the addressee node exclusively through the second relay node, as a substitution for the first relay node.

7. An ad hoc network including a plurality of nodes able to receive and transmit data messages and communicating with each other by sending signals in time slots organized in frames, wherein each node includes memory for applying the method according to claim 1, and wherein the frames include a signaling slot, allowing each node to transmit a signaling signal including signaling information, the pieces of signaling information allowing each node to determine its neighboring nodes of rank one, a connection quality with each of its neighboring nodes of rank one, its neighboring nodes of rank two, and a connection quality between each node of rank one and each node of rank two.

8. The network according to claim 7, wherein the frames further comprise:
- a source communication slot, allowing a node operating as a source node of transmitting a source communication message to a node of rank one operating as a relay node, the source communication message including useful data to be transmitted to a final addressee;
- a relay communication slot, allowing a node operating as a relay node of transmitting a relay communication message towards an addressee node, the relay communication message including a header portion integrating a pattern, characteristic of the transmitting relay node, allowing the addressee node of computing a phase of the signal corresponding to the relay communication message, and a useful payload portion including useful data to be relayed towards the addressee node; and,
- an adjustment slot, allowing a node operating as an addressee node of transmitting an adjustment message to a relay node from a set of relay nodes used in a mode for forming a bundle, the adjustment message including a phase shift.

9. The network according to claim 7, wherein each addressee node of a plurality of relay communication messages transmitted by relay nodes of a set of relay nodes used in a mode for forming a bundle, is able to compute a phase for each of said relay nodes from the signal corresponding to the incident relay communication message, to determine a phase shift between at least two of said relay nodes and to transmit the computed phase shift to one of said at least two relay nodes, in an adjustment message transmitted in a dedicated adjustment slot of the frame.

10. The network according to claim 9, wherein each node operating as a relay node is able to estimate a frequency shift of its transceiver means from the phase shift contained in a succession of adjustment messages transmitted by a same addressee node and of adjusting its transceiver means for correcting said drift.

11. The network according to claim 7, wherein the routing table of a node includes, for each addressee of useful data, the neighboring node of rank one of the relevant node and the neighboring node of rank two of the relevant node along the routing path.

* * * * *